Figure 1:
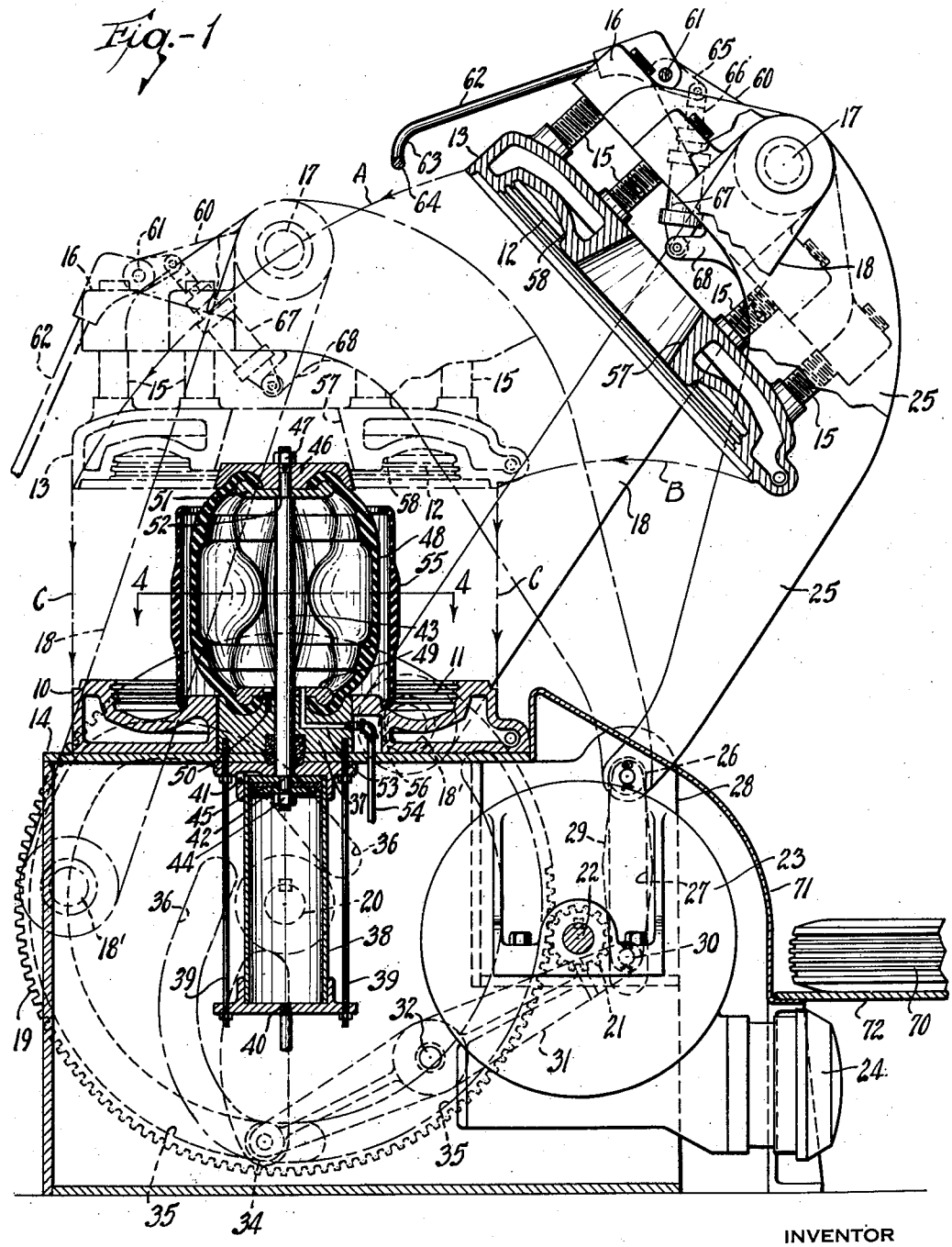

Sept. 22, 1942. L. E. SODERQUIST 2,296,800
COMBINATION TIRE BAGGING, CURING, AND DE-BAGGING UNIT
Filed Sept. 12, 1940 6 Sheets-Sheet 3

INVENTOR
LESLIE E. SODERQUIST
BY
ATTORNEYS

Sept. 22, 1942.     L. E. SODERQUIST     2,296,800
COMBINATION TIRE BAGGING, CURING, AND DE-BAGGING UNIT
Filed Sept. 12, 1940       6 Sheets-Sheet 4

INVENTOR
LESLIE E. SODERQUIST
BY Ely & Frye
ATTORNEYS

Sept. 22, 1942.  L. E. SODERQUIST  2,296,800
COMBINATION TIRE BAGGING, CURING, AND DE-BAGGING UNIT
Filed Sept. 12, 1940  6 Sheets-Sheet 6

Fig.-7

Fig.-8

INVENTOR
LESLIE E. SODERQUIST
BY
ATTORNEYS

Patented Sept. 22, 1942

2,296,800

UNITED STATES PATENT OFFICE 2,296,800

COMBINATION TIRE BAGGING, CURING, AND DEBAGGING UNIT

Leslie E. Soderquist, Akron, Ohio, assignor to The McNeil Machine & Engineering Company, Akron, Ohio, a corporation of Ohio Application September 12, 1940, Serial No. 356,427

25 Claims. (Cl. 18—17)

This invention relates to apparatus for treating pneumatic tires which combines in a single unit, three operations which heretofore have been carried out in three separate units. These operations are (1) tire bagging or inserting an airbag or pneumatic former in a flat-built tire band to cause the band to assume a shape capable of being molded into a pneumatic tire; (2) curing or vulcanizing the tire; and (3) de-bagging or removing the vulcanized tire from the airbag while at the same time the tire is removed from the vulcanizing press.

An object of the invention is to provide a single unit which will permit these three operations to be performed quickly and efficiently so as to save a large portion of the time heretofore required in performing the operations separately, and to save a substantial amount of money heretofore required in the cost, operation and maintenance of the separate units.

Another object is to combine airbag equipment with the vulcanizing press whereby the mold sections of the press may be utilized in forcing the beads of the tire band toward each other while the airbag is being expanded within the tire band.

A further object is to provide novel means for operating the press whereby, among other things, the mold sections may be utilized in shaping the tire band while the press is being closed.

A further object is to provide novel means for engaging the tire after it has been vulcanized to remove it from the airbag and mold sections simultaneously, and then to remove it entirely from the press onto a conveyor by means of which it will be carried to the next operation.

Other objects and advantages will become apparent from the following description taken in conjunction with the accompanying drawings.

Figure 2:
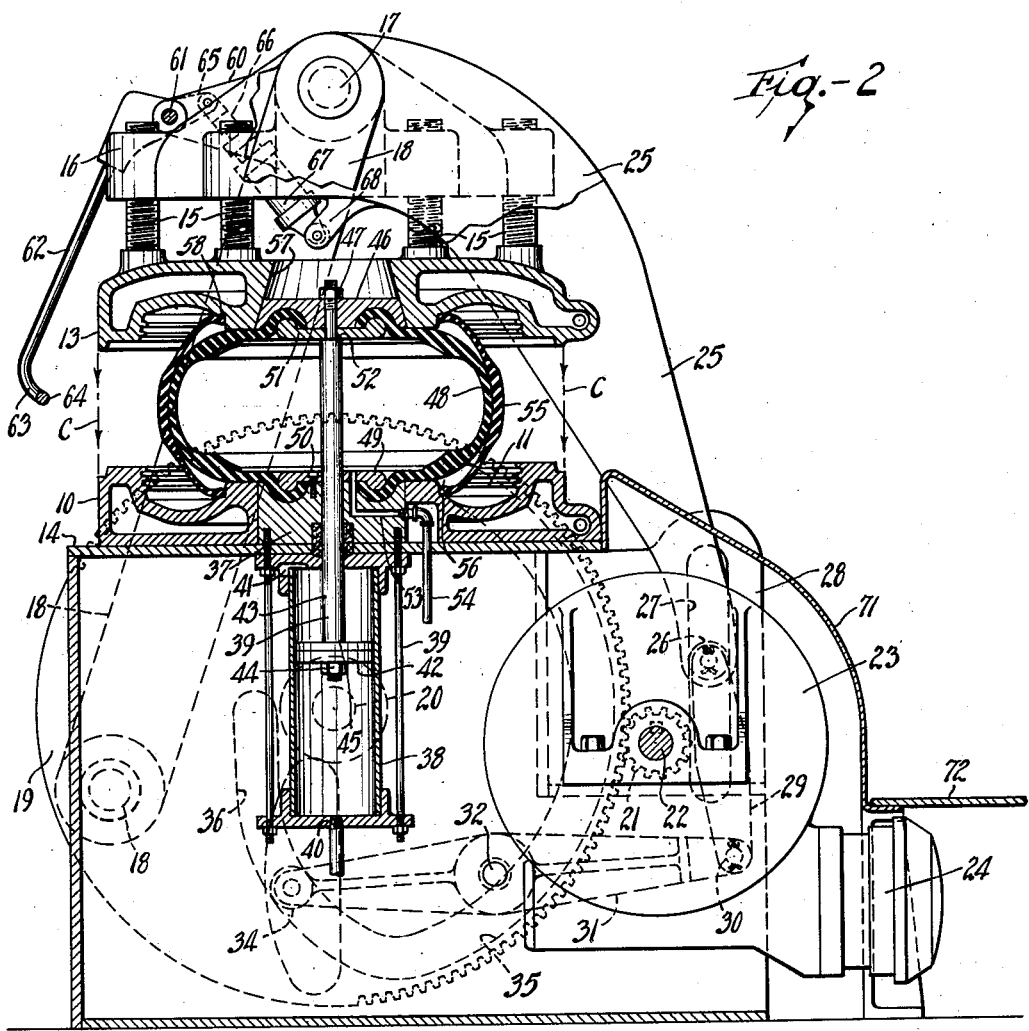
Figure 3:
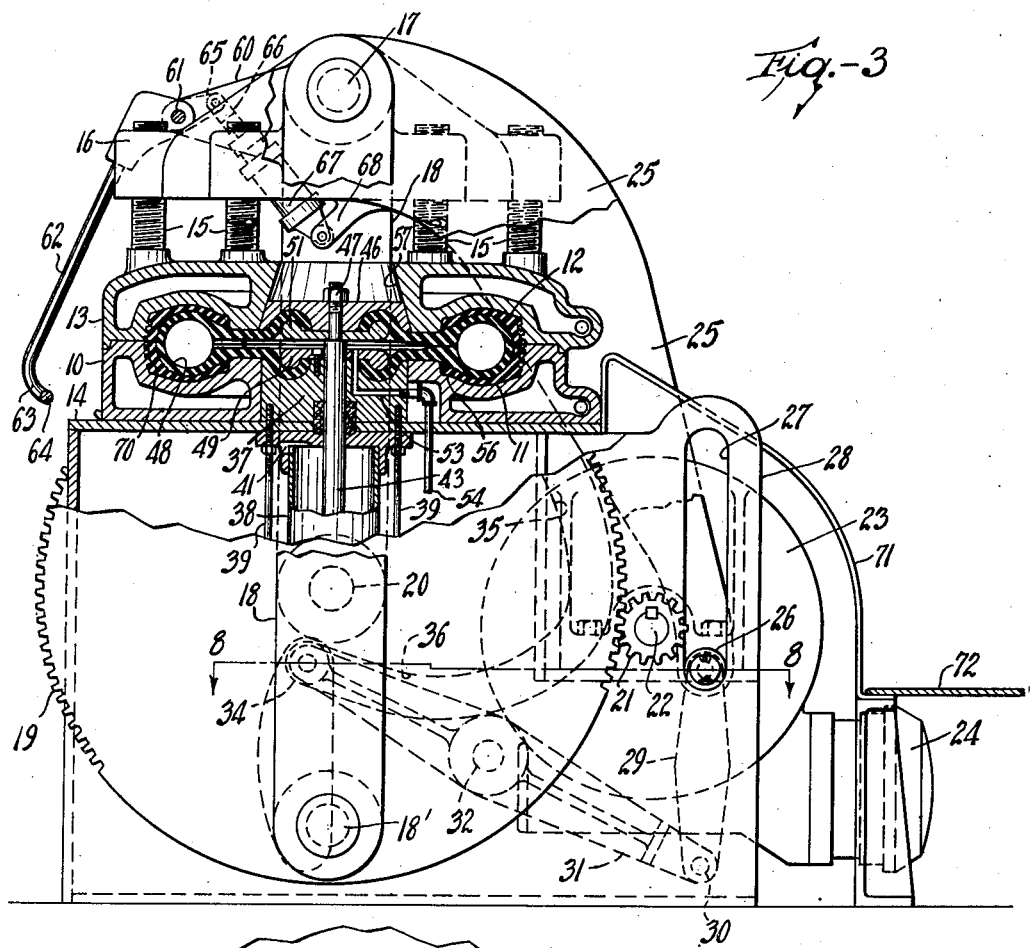
Figure 4:
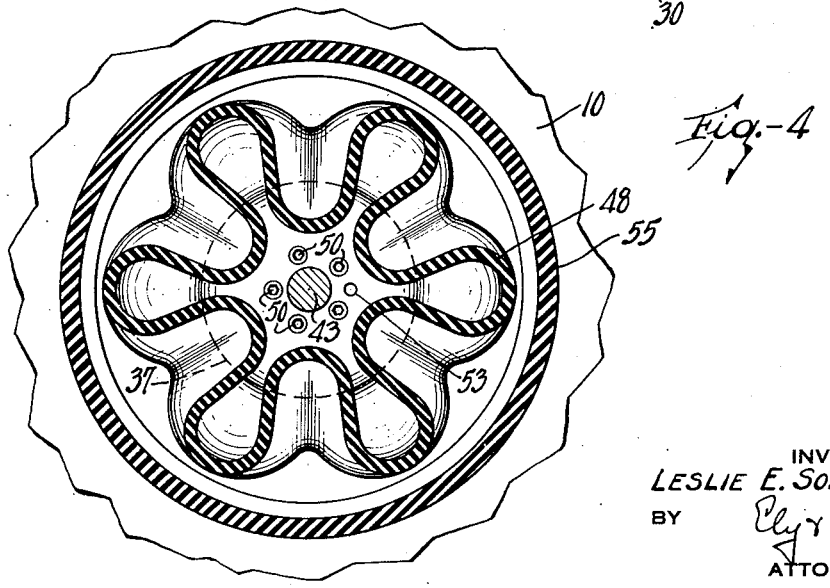
Figure 5:
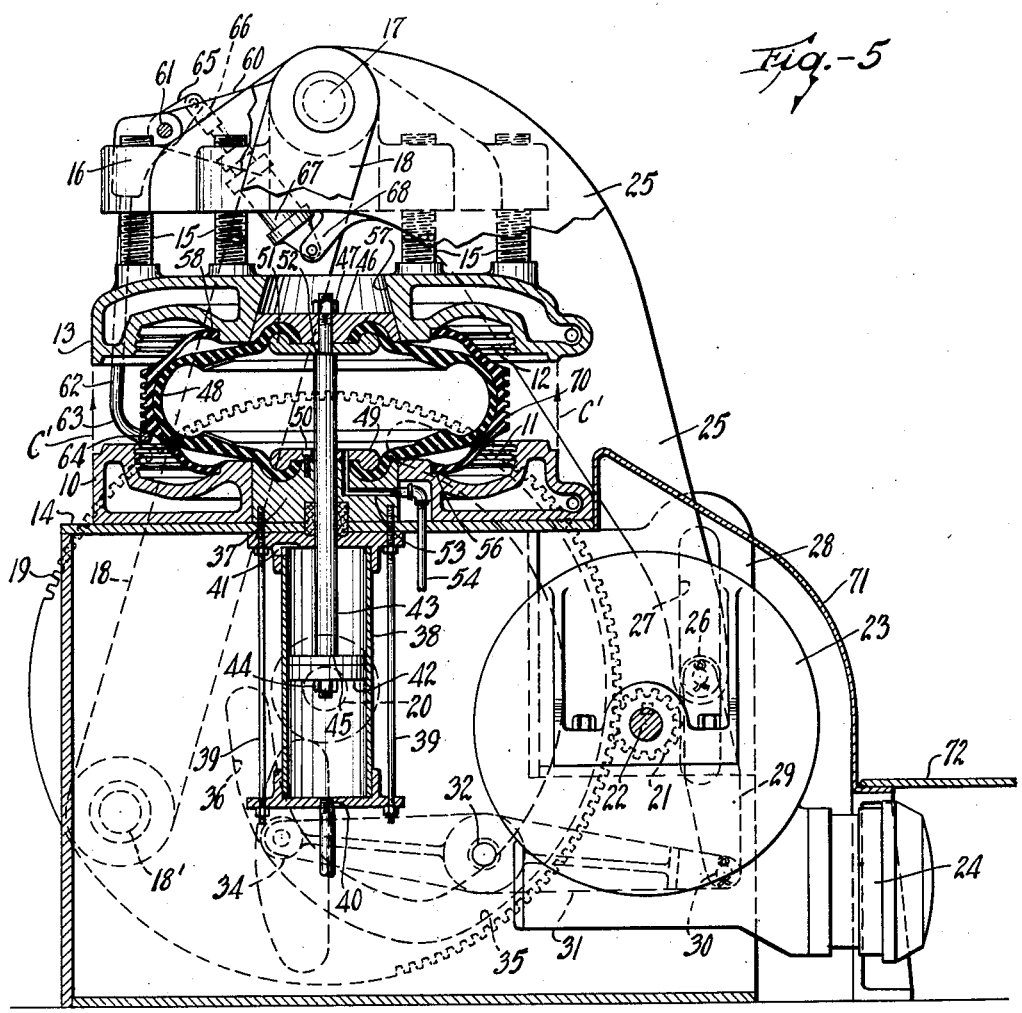
Figure 6:
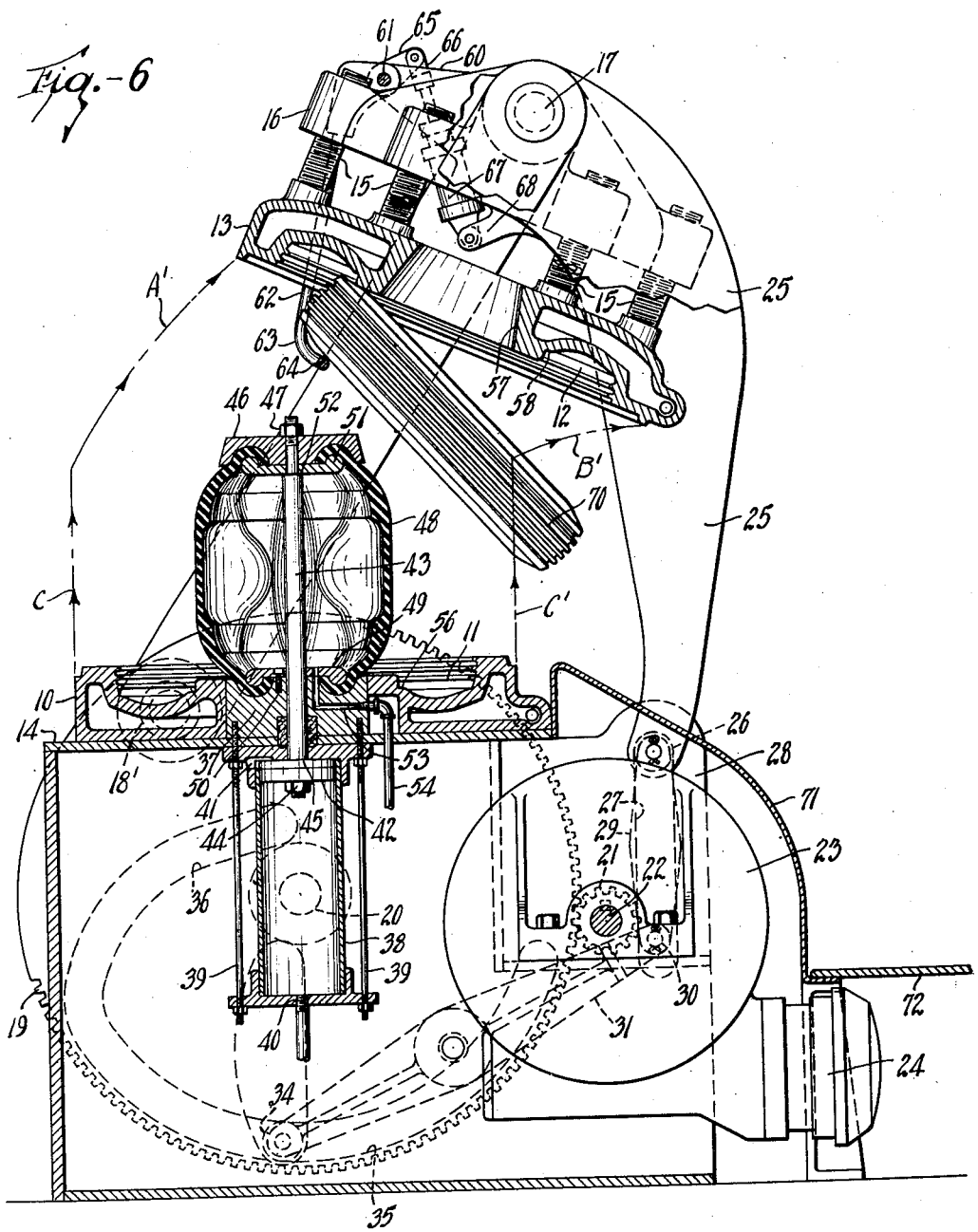

In the drawings:

Fig. 1 is a side elevation of the apparatus with the press in fully open position and with parts shown in section, Fig. 2 is a similar view with the press partially closed, Fig. 3 is a similar view with the press fully closed, Fig. 4 is an enlarged fragmentary section taken substantially on line 4—4 of Fig. 1, Fig. 5 is a side elevation of the apparatus with the press partially opened after vulcanization of the tire and with parts shown in elevation, Fig. 6 is a similar view with the press opened to the point where the tire clears the airbag, Fig. 7 is a rear elevation of the apparatus with the press closed, and Fig. 8 is an enlarged fragmentary section taken substantially on line 8—8 of Fig. 3.

Referring to the drawings the numeral 10 designates the lower stationary mold section of a two part vulcanizing press having a tire receiving cavity 11 which is complementary to a similar cavity 12 located in the upper movable mold section 13. Both mold sections are preferably steam-jacketed in the usual manner to provide an outer curing medium for a tire to be vulcanized in cavities 11 and 12, as will be understood.

Mold section 10 is mounted on a base plate 14 which is suitably supported above a foundation such as a floor. Mold section 13 is adjustably secured by bolts 15 to an upper head or platen 16 having a large pivot pin 17 extending therethrough. The ends of pin 17 pivotally carry the upper ends of a pair of parallel side pressure links 18, the lower ends of which are each pivoted as at 18' to a large gear wheel 19. Each gear wheel 19 is keyed to a shaft 20 mounted for rotation in the base of the apparatus, and teeth are preferably provided for only a portion of the outer periphery of each gear wheel, although these teeth may be extended completely around the gears. The teeth of each gear wheel 19 are in mesh with a pinion 21, each of which is keyed to a shaft 22, and the latter shafts extend into a housing 23 which contains suitable gearing (not shown) that forms a driving connection between motor 24 and pinions 21 to drive the gear wheels 19.

Preferably formed integral with head 16 are a pair of spaced guiding arms 25, the lower ends of which are pivoted to a pair of rollers 26 slidably mounted in vertical slots 27 which are located in side plates 28 that form a part of the base of the apparatus. Rollers 26 are each pivoted to one end of a link 29 while the opposite end of each link 29 is pivoted as at 30 to one end of a lever 31. Each lever 31 is pivoted intermediate its ends on a shaft 32 mounted between side plates 28 and a pair of supplemental plates 33 (Fig. 7) also forming a part of the base of the apparatus. The forward end of each lever 31 is pivoted to a roller 34 which rides in a cam slot 35 formed in each gear wheel 19. Each cam slot 35 has a portion which is concentric with the outer periphery of gear wheels 19 and has an inwardly curving portion 36 which guides rollers 34 inwardly during the closing movement of the press.

When the press is fully open it will be in the full line position shown in Fig. 1 with rollers 26 at the top of slots 27, with rollers 34 near the ends of cam slots 35 which are concentric to the gear wheels 19, and with side links 18 in the position shown. From this position the press may be closed by starting motor 24 to rotate gear wheels 19 and the first movement of the upper head 16 and mold section 13 is in an arcuate path indicated by the broken lines A and B in Fig. 1. At the end of this arcuate movement the upper part of the apparatus will have reached the broken line position shown in Fig. 1, in which position rollers 26 will still be at the top of slots 27, rollers 34 will be ready to enter the curved portions 36 of cam slots 35, and links 18 will be in the broken line position since the lower ends of these links travel in a circular path with gear wheels 19.

From the broken line position of Fig. 1, further closing movement of the press is vertical with the upper and lower mold sections in substantially parallel relation, which movement is indicated by the broken lines C in Figs. 1 and 2. In Fig. 2, the upper movable part of the apparatus is shown closer to the lower stationary part and it will be observed that rollers 34 have moved upwardly into the curved portions 36 of cam slots 35. This movement of rollers 34 causes levers 31 to pivot about their shafts 32 and by means of links 29 to pull guide arms 25 downwardly, the downward movement of arms 25 being guided by rollers 26 which are confined within slots 27. At the same time, gear wheels 19 will have turned the lower ends of links 18 to the position shown.

Continued rotation of gear wheels 19 will bring the press to the completely closed position shown in Fig. 3, in which position links 18 will be substantially vertical, rollers 26 will be at the lower ends of slots 27 and rollers 34 will be at the inner ends of cam slots 35.

During the opening movement of the press the operation of the parts is reversed as will be noted from Figs. 5 and 6. The initial opening operation moves the upper head and mold section in a vertical path in substantial parallelism with the lower mold section as indicated by the vertical broken lines C' in Figs. 5 and 6. At the completion of its vertical movement the upper section moves in an arcuate path as indicated by the broken lines A' and B' in Fig. 6 until the press again is fully opened as in Fig. 1.

Centrally of the lower mold section 10, a block 37 is removably secured to the upper surface of base plate 14, while the lower surface of this base plate has a cylinder 38 removably secured thereto, suitable securing means 39 being utilized to hold the block and cylinder to the base plate. Cylinder 38 has a lower port 40 and an upper port 41 leading into the cylinder on opposite sides of a piston 42 which is movable in said cylinder. A piston rod 43 has its lower end secured to piston 42 so that the piston is received between a nut 44 threaded on the lower end of rod 43 and a shoulder 45 formed on this rod. Piston rod 43 extends slidably through block 37 and its upper end has a tapered block or head 46 secured thereto and held in place by a nut 47 threaded on the rod.

The structure just described is adapted to carry a deformable airbag 48 of rubber or rubberized fabric or other suitable material, and the lower portion of this airbag is tightly clamped between block 37 and a clamping member 49 which may be adjustably secured to block 37 by screws 50 so as to provide a hermetic seal between the airbag and block 37 to prevent escape of air or other fluid used in the airbag. The upper portion of the airbag is similarly clamped between head 46 and a clamping member 51 which rests upon a shoulder 52 formed on piston rod 43, the arrangement being such that a hermetic seal may be formed by tightening nut 47. Thus, airbag 48 is removably secured in a position substantially centrally of the lower mold section in a manner to prevent leakage of fluid from the bag.

Block 37 is provided with a port 53 which communicates at one end with the interior of airbag 48 and at its other end with a line 54, whereby the air in the airbag may be completely evacuated when desired and fluid may be permitted to enter the airbag to expand the latter when desired. Figs. 1 and 4 show the condition of the airbag 48 when the air is sufficiently evacuated therefrom to cause the bag to assume, in cross-section, substantially the shape shown in Fig. 4, and in this evacuated condition, the airbag is of such size that a "pulley-band" or "flat-built" tire construction 55 will freely pass over the airbag to assume substantially the position shown in Fig. 1. In the latter position the lower bead of tire band 55 rests approximately against shoulder 56 formed in cavity 11 of the lower mold section and the press is then ready to be closed to shape the tire to proper form for curing and to confine the tire so that it may be cured.

The center of upper mold section 13 is provided with a tapered opening 57 which receives the tapered block or head 46 on piston rod 43 when the upper mold section moves toward the lower. As clearly shown in Fig. 2, block 46 fits snugly in the large outer end portion of opening 57, and as the upper section moves from the broken line position in Fig. 1 to the position in Fig. 2, the upper bead of tire band 55 will engage approximately against shoulder 58 formed in cavity 12 of mold section 13. As soon as the upper bead on tire band 55 is engaged by the upper mold section the vacuum in airbag 48 is discontinued and hot air or other curing medium enters port 53 to expand the airbag and cause it to assume the shape necessary to assist in bringing the tire band 55 to proper form for seating in mold cavities 11 and 12.

Thus, as the mold sections approach each other the beads of the tire band are moved toward each other while the rest of the tire band is expanded outwardly by airbag 48 until eventually the tire and airbag assume the shape shown in Fig. 3 when the press is completely closed. During the downward movement of the upper mold section the latter has forced piston rod 43 and piston 42 downwardly toward the lower end of cylinder 38. The tire may now be vulcanized for the desired length of time and at the end of the cure the curing medium is evacuated to the extent that only a small amount at a pressure preferably under five pounds per square inch remains in airbag 48. This amount of pressure ordinarily is not dangerous and will not cause bursting of the tire and bag when the press is opened.

The upper press head 16 is provided with a pair of preferably integral lugs 60 that rotatably receive the ends of a shaft 61 to which are fixed the upper ends of a pair of arms 62 which extend downwardly to the sides of and below the upper mold section 13. The lower ends of arms 62 are curved inwardly as at 63 and are connected to a rod 64 which extends across the front of the press as shown in Fig. 7. Also connected to shaft 61 is a short arm 65 which extends rearwardly at an angle and has its outer end connected to a piston 66 that operates in an air cylinder 67 secured to an extension 68 formed on head 16. Arm 65, shaft 61 and arms 62 operate in the same manner as a bell crank lever whereby when air under pressure is admitted to the lower end of cylinder 67 in the conventional manner, piston 66 will move outwardly and cause arm 65 to turn shaft 61 and arms 62 downwardly.

During the closing movement of the press and during the vulcanizing period, arms 62 and rod 64 are held out of the way, as shown in Figs. 1, 2 and 3, so as not to interfere with these operations. As soon, however, as the press is ready to open, air is admitted to cylinder 67 so that arms 62 and rod 64 will swing inwardly, as in Fig. 5, to engage the now vulcanized tire 70 and assist in removing it from the mold sections and from airbag 48.

When the press is ready to be opened after vulcanization, the motor 24 is started to turn gear wheels 19 in the opposite direction and at the same time air is admitted to the lower end of cylinder 38 to keep block 46 in tight engagement with the upper mold section 13 until this block reaches the end of its upward movement. As the upper mold section moves upwardly in parallel relation to the lower mold section the tire 70 will pull out of the mold sections substantially as shown in Fig. 5 and rod 64 will move under the tread portion of the tire at approximately the point shown in Fig. 5. At this time the air in airbag 48 is evacuated and the bag will again assume the position shown in Figs. 1 and 6 as soon as piston 42 reaches the upper end of cylinder 38. By the time the airbag assumes its initial position and shape, tire 70 will clear the airbag and since the tire is held against the upper mold section by rod 64, as shown in Fig. 6, this tire will be carried with the upper mold section until the latter reaches the end of its opening movement. At the end of this opening movement the tire will be above the curved guideway 71, so that by releasing the air in cylinder 67 and allowing arms 62 and rod 64 to return to their outer position, the tire will be released to fall on the guideway 71, from where it will slide down upon conveyor 72 to be carried away.

It will be apparent from the foregoing that I have provided a single unit in which a tire is bagged, vulcanized and de-bagged in a minimum of time and at a substantial saving in cost. The unit is well adapted for operation in the manner described and, if desired, may be made fully automatic after the tire band is placed in the lower mold section, by providing suitable timing mechanism which is well known in this art.

While I have shown and described one form of the invention it will be obvious that changes and modifications may be made therein without departing from the spirit of the invention or from the scope of the subjoined claims.

What is claimed is:

1. In apparatus of the character described, in combination, a pair of complementary relatively movable mold sections, an inflatable former arranged between said mold sections, means for supporting a tire in "pulley-band" shape around said inflatable former and on one of said mold sections, means for moving the mold sections together to form said "pulley-band" into tire shape and to insert said inflatable former therein, and mechanical means for removing said tire from around said inflatable former when the mold sections are being separated.

2. In apparatus of the character described, in combination, an upper movable mold section and a lower complementary stationary mold section, an inflatable former arranged substantially centrally of said lower mold section, means for supporting a tire in "pulley-band" shape around said inflatable former and upon said lower mold section, means for moving said upper mold section toward said lower mold section to form said "pulley-band" into tire shape and to insert said inflatable former therein, and mechanical means for removing said tire from around said inflatable former when the mold sections are being separated.

3. In apparatus of the character described, in combination, a pair of complementary upper and lower relatively movable mold sections, an inflatable former arranged substantially centrally of said lower mold section, means for supporting a tire band around said inflatable former and upon said lower mold section, means for moving the mold sections together to form said tire band into tire shape and to insert said inflatable former therein, and mechanical means for removing said tire from around said inflatable former when the mold sections are being separated.

4. In apparatus of the character described, in combination, an upper movable mold section and a lower complementary stationary mold section, an inflatable former arranged substantially centrally of said lower mold section, means for supporting a tire in "pulley-band" shape around said inflatable former and upon said lower mold section, means for moving said upper mold section toward said lower mold section to form said "pulley-band" into tire shape and to insert said inflatable former therein, means for vulcanizing the shaped tire in said mold sections, and mechanical means for simultaneously removing the inflatable former from the vulcanized tire and for removing the vulcanized tire from around said inflatable former.

5. In apparatus of the character described, in combination, a pair of complementary relatively movable mold sections, and means for relatively moving said mold sections comprising a pair of spaced pressure links carrying one of said mold sections, a pair of gear wheels to which said links are respectively pivotally secured, supporting means for the other of said mold sections and having a guide slot therein adjacent said gear wheels, a pair of guide arms secured at one end to the mold section carried by said links and their opposite ends being movable in said guide slot, connections between said guide arms and said gear wheels, and means for rotating said gear wheels.

6. Apparatus in accordance with claim 5 wherein said connections include a cam roller, and wherein at least one of said gear wheels is provided with a cam slot to receive said roller.

7. Apparatus in accordance with claim 5 wherein said connections include a pivoted lever connected at one end with one of said guide arms, the opposite end of said lever carrying a cam roller, at least one of said gear wheels being provided with a cam slot to receive said roller.

8. In a tire press of the character described, in combination, means including a pair of relatively movable mold sections for shaping a "flat-built" tire and inserting an inflatable forming member therein, means for vulcanizing the shaped tire, and a common means for separating the vulcanized tire from the inflatable forming member and for removing the vulcanized tire from the press.

9. In a tire press of the character described, in combination, a pair of relatively movable mold sections, an inflatable former arranged between said mold sections, means for shaping a "flat-built" tire and inserting said inflatable former therein by moving said mold sections together, means for vulcanizing the shaped tire in said mold sections, and a common means for separating the vulcanized tire from the inflatable forming member and for removing the vulcanized tire from the press.

10. In a tire press of the character described, in combination, a pair of complementary relatively movable mold sections, an inflatable former carried by one of said mold sections, means including said last mentioned mold section for supporting a tire in "pulley-band" form around said inflatable former and between said mold sections, means for moving said mold sections together while in contact with said "pulley-band" to thereby form the latter into tire shape and to insert said inflatable former therein, means for vulcanizing the shaped tire in said mold sections, and a common means for separating the vulcanized tire from the inflatable forming member and for removing the vulcanized tire from the press.

11. In a tire press of the character described, in combination, means including a pair of relatively movable mold sections for shaping a "flat-built" tire and inserting an inflatable forming member therein so that the shaped tire will be around the inflatable forming member, means for vulcanizing the shaped tire, and a common means for separating the vulcanized tire from the inflatable forming member and for removing the vulcanized tire from around the inflatable forming member.

12. In a tire press of the character described, in combination, a pair of relatively movable mold sections, an inflatable former arranged between said mold sections, means for shaping a "flat-built" tire and inserting said inflatable former therein by moving said mold sections together so that said shaped tire will be around the inflatable forming member, means for vulcanizing the shaped tire in said mold sections, and a common means for separating the vulcanized tire from the inflatable forming member and for removing the vulcanized tire from around the inflatable forming member.

13. In a tire press of the character described, in combination, a pair of complementary relatively movable mold sections, an inflatable former carried by one of said mold sections, means including said last mentioned mold section for supporting a tire in "pulley-band" form around said inflatable former and between said mold sections, means for moving said mold sections together while in contact with said "pulley-band" to thereby form the latter into tire shape and to insert said inflatable former therein so that said shaped tire is around said inflatable former, means for vulcanizing the shaped tire in said mold sections, and a common means for separating the vulcanized tire from the inflatable former and for removing the vulcanized tire from around the inflatable former.

14. In a tire press, a pair of complementary mold sections at least one of which is movable to open and close the press, means including said mold sections for shaping a "flat-built" tire and inserting an inflatable former in the tire during the closing movement of the press, means for vulcanizing the shaped tire in the press, and a common means for separating the vulcanized tire from the inflatable former and for removing the vulcanized tire from the press, said common means being operable in timed relation to the opening movement of the press.

15. A press of the character described in claim 14 wherein said common means comprises a tire engaging member carried on the movable mold section.

16. In a tire press, a pair of complementary mold sections at least one of which is movable to open and close the press, an inflatable former arranged between said mold sections, means including said mold sections for shaping a "flat-built" tire and inserting said inflatable former in said tire during the closing movement of said press so that said shaped tire will be around said inflatable former, means for vulcanizing the shaped tire in said mold sections, and a common means for separating the vulcanized tire from the inflatable former and for removing the vulcanized tire from around the inflatable former, said common means being operable in timed relation to the opening movement of the press.

17. A press of the character described in claim 16 wherein said common means comprises a tire engaging member carried on the movable mold section.

18. In a tire press, a pair of complementary mold sections at least one of which is movable to open and close the press, an inflatable former carried by one of said mold sections, means including said last mentioned mold section for supporting a tire in "pulley-band" form around said inflatable former and between said mold sections, means for moving said mold sections together while in contact with said "pulley-band" to thereby form the latter into tire shape and to insert said inflatable former therein during the closing movement of the press, means for vulcanizing the shaped tire in said mold sections, and a common means for separating the vulcanized tire from the inflatable former and for removing the vulcanized tire from the press, said common means being operable in timed relation to the opening movement of the press.

19. A press of the character described in claim 18 wherein said common means comprises a tire engaging member carried on the movable mold section.

20. In a tire press, a pair of complementary mold sections at least the upper section of which is movable to open and close the press, an inflatable former arranged between said mold sections, means including said mold sections for shaping a "flat-built" tire and inserting said inflatable former in the tire during the closing movement of the press so that said tire will be around said inflatable former, means for vulcanizing the shaped tire in the press, and a common means for separating the vulcanized tire from the inflatable former and for removing the vulcanized tire from around the inflatable former.

21. A press of the character described in claim 20 wherein said common means is operable in timed relation to the opening movement of the press.

22. A press of the character described in claim 20 wherein said common means comprises a tire engaging member carried on the upper mold section and operable in timed relation to the opening movement of the press.

23. In a tire press of the character described, in combination, means for shaping a "flat-built" tire, means for vulcanizing the shaped tire, and means for removing the vulcanized tire from the press at the rear of the latter.

24. A press of the character described in claim 23 wherein said first named means includes a pair of mold sections at least one of which is movable to open and close the press, and wherein said last means is operable in timed relation to the opening movement of the press.

25. A press of the character described in claim 23 wherein said first named means includes a pair of mold sections at least one of which is movable to open and close the press, and wherein said last named means comprises a tire engaging member carried on said movable mold section and operable in timed relation to the opening movement of the press.

LESLIE E. SODERQUIST.